June 14, 1955 A. HUFNAGEL 2,710,953
HIGH SELECTIVITY RESONANT CIRCUITS
Filed July 29, 1952 2 Sheets-Sheet 1

INVENTOR.
Andrew Hufnagel
BY W. L. Stout
HIS ATTORNEY

June 14, 1955 A. HUFNAGEL 2,710,953

HIGH SELECTIVITY RESONANT CIRCUITS

Filed July 29, 1952 2 Sheets-Sheet 2

INVENTOR.
Andrew Hufnagel.
BY W. L. Stout.
HIS ATTORNEY 2,710,953

HIGH SELECTIVITY RESONANT CIRCUITS

Andrew Hufnagel, Penn Township, Allegheny County, Pa., assignor to Westinghouse Air Brake Company, Wilmerding, Pa., a corporation of Pennsylvania Application July 29, 1952, Serial No. 301,577

4 Claims. (Cl. 340—171)

Figure 1:
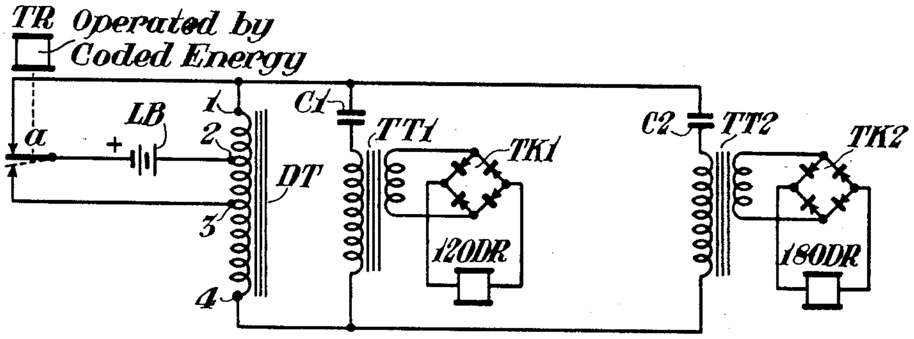

My invention relates to high selectivity resonant circuits, and particularly to high selectivity resonant circuits for use in coded signaling systems. More particularly, my invention relates to the provision of high selectivity resonant circuits for decoding the operation of the contacts of a recurrently-operated or code following relay in a coded railway signaling system.

In coded railway signaling systems, it is customary to supply impulses of energy of several different code rates or frequencies to the system, according to traffic conditions. The code following relays incorporated in the system, whether they be wayside relays associated with a coded track circuit, or vehicle carried relays in a coded train control or cab signal system, are constructed and arranged so that they operate their contacts recurrently in synchronism with the impulses of coded energy received. Associated with the code following relays is suitable equipment for determining the code rate or frequency of operation of the contacts of the relays.

Such code detecting and code decoding equipment is old and well-known in the art, one such an arrangement being shown in Letters Patent of the United States No. 2,237,788 issued to Frank H. Nicholson et al. on April 8, 1941, for Railway Traffic Controlling Apparatus. The code decoding arrangements previously proposed are usually of the type in which the recurrent operation of the contact of the code following relay supplies impulses of direct current energy to one winding of a transformer, and accordingly causes an alternating current energy having the same frequency as the frequency of operation of the code following contact to be set up in another winding of the transformer. This alternating current energy is supplied to code decoding units which include tuned resonant circuits, tuned to the particular frequencies which it is desired to detect. The code decoding units most commonly employed comprise a transformer having a first or primary winding connected in series with a condenser, to form a series resonant circuit, and having a second or secondary winding connected to a direct current relay through a full-wave rectifier, so that when energy of the proper frequency is supplied to the input terminals of the code decoding unit, sufficient energy is supplied to the winding of the relay to cause its contacts to become picked up. As is well known in the electrical art, the circuits may be readily tuned by proper adjustment of the inductive and capacitive components, to produce relatively sharp frequency selective characteristics.

It has been found, however, that code decoding units of this type will not only respond to the operation of the code following relay contacts at the fundamental frequency to which the resonant circuit of the code decoding unit is tuned, but will also respond to operation of the contact of the code following relay under conditions in which the alternating current supplied to the decoding unit has a complex wave, one component of which is of the fundamental frequency to which the resonant circuit is tuned. That is, such units will respond if the code following relay is operated by a scrambled or mixed code, in such manner that the pickup or "on" time and release or "off" time of the relay are unequal, but are at such intervals as to represent a harmonic or subharmonic frequency of the frequency to which the resonant circuit of the code decoding unit is tuned. For example, if the code following contact is operated in such manner that its contacts are only picked up on every third impulse or "on" period of a code, the energy supplied to the code decoding unit will contain the fundamental frequency, with every third half-cycle or "on" period present, and with two half-cycles or "on" periods missing. Under these conditions, it is possible that the relay associated with the code decoding unit may become picked up falsely, since it is not desired to have these relays energized except when energy of the fundamental frequency alone, represented by code of the fundamental frequency with a 50 per cent "on" time, is operating the code following contact.

Accordingly, it is an object of my invention to provide high selectivity resonant circuits for coded signaling systems, which will respond only to code operation of the associated code following contact by a code of the fundamental frequency alone, and which will not be responsive to mutilated or scrambled codes containing frequency components equal to the fundamental frequency.

Another object of my invention is to provide an improved code decoding arrangement for railway signaling systems, in which means are provided for damping out oscillations which take place in the resonant or frequency selective circuits when these oscillations are not in synchronism with the operation of the code following contacts associated with the apparatus.

Another object of my invention is to provide an improved frequency code detecting system for coded railway signaling systems, including asymmetric units suitably disposed to afford a high impedance to oscillating currents when out of synchronism with the code following relay operation.

Other objects and advantages of my invention will be apparent from the following description taken in connection with the accompanying drawings.

In practicing my invention, I provide, in addition to the usual code decoding apparatus, one or more asymmetric units suitably disposed in the circuits of the apparatus and poled in such manner that the asymmetric units afford a relatively low impedance to the circulating currents which are set up by the resonant circuits in normal operation of the apparatus, but which present a high impedance to the oscillating currents when the phase of the oscillating currents is out of synchronism with the operation of the contact of the code following relay. The asymmetric units may be disposed in the circuits in different arrangements, depending upon whether it is desired to detect a distortion of the code with respect to "on" or "off" time, or to detect a scramble of two codes, and also depending upon whether or not one or more than one frequency selective or resonant circuits are associated with the code decoding equipment.

I shall show and describe two forms of high selectivity resonant circuits embodying my invention, as employed in connection with a code decoding arrangement for railway signaling systems, and shall then point out the novel features thereof in claims.

Figure 2:
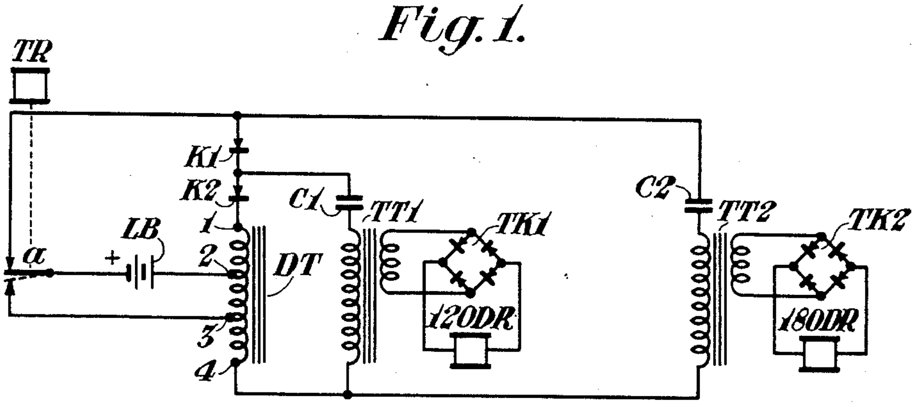
Figure 3:
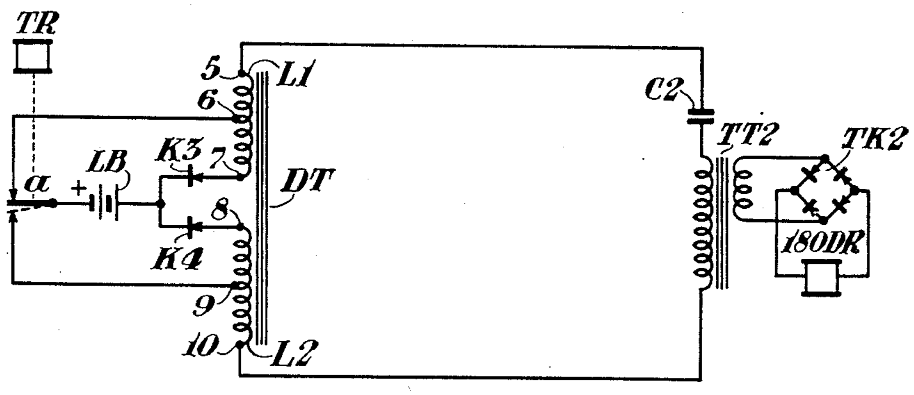

The accompanying drawings show several forms of code decoding equipment, in which Fig. 1 shows a conventional type of code decoding arrangement as presently employed;

Fig. 2 shows a first embodiment of my invention as employed with a code decoding system in which two frequency selective circuits are assocaited with the equipment, and in which it is desired to detect distortion of the code with respect to the "on" time thereof; and Fig. 3 shows a modification of a code decoding equipment embodying my invention, in which one frequency selective circuit is used and in which the apparatus is arranged to detect distortion in both the "on" time and "off" time of the controlling contact.

Figure 4:
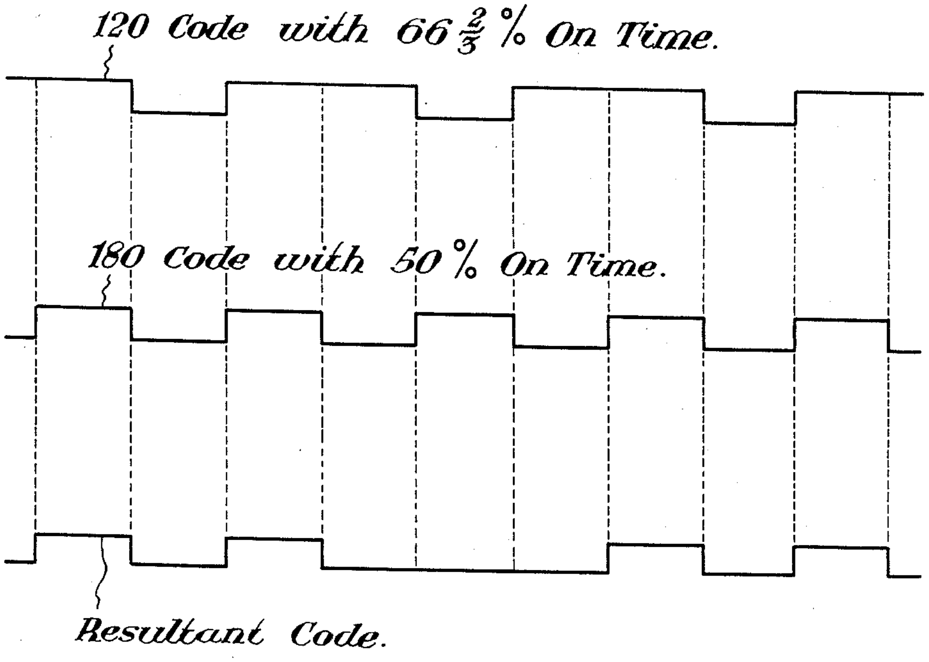

Fig. 4 is a diagrammatic view of the waveforms which may be encountered in the operation of the apparatus.

Similar reference characters refer to similar parts in each of the several views.

Referring first to Fig. 1, which shows a conventional type of code decoding equipment, the relay TR, which may be either a track relay associated with a coded railway track circuit, or may be a relay carried on a vehicle and adapted to operate a coded cab signal or train control system, has a contact *a,* which is recurrently operated between its picked up and released positions in accordance with the impulses of energy supplied to the winding of the relay TR. The apparatus for decoding the code following operation of contact *a* of relay TR includes a suitable source of low voltage direct current, such as the battery LB, a decoding transformer DT, a first decoding unit comprising a capacitor C1, a tuned transformer TT1, a rectifier TK1, and the associated relay 120DR. A second decoding unit comprises a capacitor C2, a tuned transformer TT2, a full-wave rectifier TK2, and the relay governed thereby, 180DR.

In operation, each time that the code following contact *a* is in its picked-up position a circuit is established for supplying energy to an upper portion of the winding of transformer DT, which circuit may be traced from the positive terminal of battery LB, over front contact *a* of the code following relay TR, through the upper portion of the winding of transformer DT between terminals 1 and 2, and from terminal 2 to the negative terminal of battery LB. Each time that contacct *a* of relay TR is released, a circuit is established for supplying energy to a center portion of the winding of decoding transformer DT which may be traced from the positive terminal of battery LB over back contact *a* of relay TR, through the winding of transformer DT from terminal 3 to terminal 2, and thence to the negative terminal of battery LB. Accordingly, it will be seen that the recurrent operation of contact *a* causes a corresponding flow of energy in opposite directions in two portions of the winding of the decoding transformer DT between terminals 1 and 3. The transformer DT is of the autotransformer type, and the supply of energy in alternate directions to the portions of the winding between terminals 1 and 3 causes an alternating voltage to be induced in the winding of the transformer which appears across the terminals 1 and 4. As usually provided, the transformer is constructed and arranged so that the alternating current energy which appears across terminals 1 and 4 has a voltage which is approximately twice the value of the voltage applied to the portion of the transformer winding between terminals 1 and 3.

It will be seen, therefore, that with the contact *a* of relay TR recurrently operated at a predetermined rate, an alternating current voltage will appear across terminals 1 and 4 of the decoding transformer DT, the frequency of this energy being of the same value as the rate of operation of the contact *a* of relay TR. This alternating current energy is supplied to the tuned resonant or frequency selective circuits of the two decoding units, previously described, and if the frequency of this energy is equal to the frequency for which one or the other of the resonant circuits of these units is tuned, sufficient energy will be supplied to the winding of the associated relay through the full-wave rectifier to cause the relay to pick up its contacts. That is, for example, if the frequency selective circuit including the capacitor C1 and the transformer TT1 is tuned to series resonance at the frequency of 120 cycles per minute, the relay 120DR will be picked up when the contact *a* operates at the rate of 120 operations per minute. Similarly, if the frequency selective circuit comprising the capacitor C2 and transformer TT2 is proportioned and arranged to be resonant at the frequency of 180 cycles per minute, the relay 180DR will be picked up when energy of this frequency is supplied to the circuit from the transformer DT, as a result of the contact *a* operating at a rate of 180 times per minute.

The arrangement of circuits shown in Fig. 1 and described above is old and well-known in the art, and is shown and described herein in order to more clearly point out the features and advantages of my invention.

In connection with the arrangement shown in Fig. 1, it has been found that the decoding units, such as those associated with the relays 120DR and 180DR, may pass sufficient energy to their associated relays to pick up the relays even though the contact *a* is operating irregularly due to the relay TR being subjected to mixed or scrambled codes or to codes which have unequal "on" and "off" times, when such irregular operations produce an alternating voltage wave having a component equal to the fundamental frequency to which the resonant circuit of the unit is tuned. For example, the 180DR relay may be picked up if the relay TR is operating at the rate of 90 times per minute, with a 25 per cent "on" time, or at a rate of 60 times per minute with a 50 per cent "on" time, since each of these rates have a component equal to the fundamental 180 cycles per minute frequency to which the resonant circuit of the unit is tuned. These rates may be considered as a normal 180 code which has been mutilated to the extent that certain "on" or "off" periods are missing. Such mutilated or distorted codes are usually a result of a defect existing somewhere in the circuit for supplying energy to the relay TR, and under certain conditions may pick up the relay 180DR, causing an undesirable situation.

It is also undesirable to have the 180DR relay picked up on a combination, or superposition, of two codes. One of the most difficult situations to guard against is that in which the operation of the contact *a* of relay TR is at the rate of 180 times per minute with every third "on" period missing. This situation may arise from certain combinations of codes being impressed upon the code following relay TR. An example of this operation is illustrated diagrammatically in Fig. 4, in which a 120 code having 66⅔ percent "on" time, is supplied to the winding of relay TR at the same time that a normal 180 code having 50 percent "on" time is supplied to the relay winding. This "scrambled" or mixed code causes the relay contacts to operate in the same manner as a normal 180 code with every third "on" period missing. A particular advantage of my invention is that such operation cannot cause the 180DR relay to become picked up under such circumstances.

It will be seen, therefore, that the code detecting apparatus as presently employed may be subject to improper operation if the code following contact which governs the apparatus is operated at rates which include the fundamental frequency to which the frequency selective circuits of the units are tuned, even though the operation of the contact at this rate may be the result of mutilated or scrambled codes.

In Fig. 2 of the drawings, there is shown an arrangement similar to the conventional code decoding arrangement shown in Fig. 1, modified in accordance with my invention, which will provide a high degree of immunity to operation of the contact *a* of the code following relay at any combination of code frequencies or mutilated codes which would otherwise cause erroneous operation of the decoding units.

As shown in the drawing, there is provided a pair of asymmetric units K1 and K2, which may be of any suitable type, for example, the well-known copper oxide rectifier variety. The asymmetric units are connected to the terminal 1 of the decoding transformer DT, in the connection which is common to the front contact of contact *a* of relay TR and the connections to the capacitors.

C1 and C2 of the frequency selective circuits. It will be seen that the asymmetric units K1 and K2 are each poled to permit the flow of energy from the battery LB, over the front contact *a* of relay TR, and through the upper portion of the winding of transformer DT, without offering a high impedance to the circulating current. It will also be noted that the asymmetric unit K2 is in series with a circuit through which the oscillating current flowing in the frequency selective circuit comprising the capacitor C1 and the primary winding of transformer TT1 must flow. Accordingly, it will be seen that when the direction of the oscillatory current is such as to flow through the asymmetric unit K2 from top to bottom, the impedance to the flow of the current will be relatively small, but when the oscillatory current is forced to flow through the asymmetric unit in the reverse direction, that is from bottom to top, a relatively high impedance will be offered to the oscillatory current by virtue of the asymmetric qualities of the unit K2 and the current will be highly damped. Similarly, the oscillatory currents which flow through the frequency selective circuit comprising the capacitor C2 and the primary winding of transformer TT2 are afforded a relatively low impedance path when the direction of current flow is such as to flow through the asymmetric unit K1 and asymmetric unit K2 in series, in the low resistance direction of the units. However, if the oscillatory current is required to flow through the asymmetric units in the high resistance direction, a relatively large impedance will be presented to the current, which will cause a relatively quick damping of the oscillation.

It is believed that the description of the operation of the apparatus arranged in accordance with my invention will be enhanced by describing the operation of the equipment under various conditions.

It will first be assumed that the contact *a* of relay TR is operating recurrently at a 120 code frequency, with the contact occupying its picked-up and released position for equal intervals during each cycle, that is, with 50 per cent "on" time. Accordingly, each time that contact *a* of relay TR is picked up energy is supplied from the battery LB to the winding of decoding transformer DT by a circuit which may be traced from the positive terminal of battery LB, over front contact *a* of relay TR, through the asymmetric units K1 and K2 in their low resistance direction, to the terminal 1 of the transformer winding, the portion of the winding to terminal 2, and from terminal 2 of the transformer winding to the negative terminal of battery LB. When the contact *a* of relay TR is in its released position, energy is supplied to the winding of transformer DT from the battery LB by a circuit which may be traced from the positive terminal of the battery over back contact *a* of relay TR, to terminal 3 of the transformer winding, and through the winding to terminal 2 and then to the negative terminal of the battery. Accordingly, it will be seen that the winding of transformer DT is supplied with energy which is recurrently reversed in direction, so that the flux set up in the transformer core is alternately reversed. As the result of the flux reversal, an induced voltage is generated in the winding of transformer DT, which voltage appears across the terminals 1 and 4 of the transformer winding. Each time that the contact *a* of relay TR picks up, the polarity of the induced voltage is such that the terminal 2 of the transformer winding is positive with respect to terminal 4. Accordingly, at this time a circuit is provided for supplying energy to the resonant circuit including the capacitor C1 and the primary winding of transformer TT1, which circuit may be traced from terminal 2 of the winding of transformer DT, through the battery LB, over front contact *a* of relay TR, through the asymmetric unit K1 to the top element of the capacitor C1, and from the lower element of capacitor C1 through the primary winding of transformer TT1 to the terminal 4 of the transformer DT. Accordingly, it will be seen that at this time the capacitor C1 in the resonant circuit for the 120 decoding unit will be charged in such manner that its upper element will be positive with respect to the lower element. Since the charging energy passes through the asymmetric unit K1 in its low resistance direction, very little of the energy in the oscillating circuit will be dissipated at this time.

When contact *a* of relay TR releases, the polarity of the induced energy in the winding of transformer DT will be such that terminal 4 is positive with respect to terminal 1, and accordingly, the direction of current produced by the induced voltage is such as to add to the discharge current of the capacitor C1, which will discharge through the circuit comprising the asymmetric unit K2, the winding of transformer DT, and the primary winding of the transformer TT1. By the successive operations of the contact *a* of the relay TR, the oscillating current in the winding of transformer TT1 gradually builds up to a predetermined value, with the result that the voltage appearing across the secondary winding of the transformer TT1 rises to a value which is effective to supply sufficient direct current to the winding of relay 120DR to cause the relay to pick up its contacts.

It will be seen that energy is also supplied at this time from the winding of transformer DT to the frequency selective unit comprising the capacitor C2 and the primary winding of transformer TT2, but since the resonant frequency of this circuit is assumed to be 180 cycles per minute, insufficient energy will be supplied therefrom to the winding of relay 180DR to pick up the relay.

It will now be assumed that, for one reason or another, such as the operation of the relay TR by a scrambled or mutilated code, the contact *a* of relay TR is not operating at 120 operations per minute with equal picked-up and released times, but is operating at some rate such that the "on" time of the contact *a* is reduced substantially below the value of 50 per cent. Under this condition, the front contact *a* will open during the time that the oscillating current in the circuit comprising the capacitor C1 and the primary winding of transformer TT1 is in such direction as to be flowing through the winding of transformer DT from terminal 4 to terminal 2, through the battery LB, front contact *a* of relay TR, capacitor C1 and winding of transformer TT1 to terminal 4. When contact *a* of relay TR opens, the circuit for the oscillating current energy previously traced is interrupted, and the only path afforded for the current at this time is through the asymmetric unit K2 in its high resistance direction, that is, from terminal 2 of transformer DT to terminal 1 of transformer DT, through the asymmetric unit K2 from bottom to top, and thence to the uppermost element of the capacitor C1. Since the energy must flow through a circuit having a relatively high impedance, the oscillating energy will be quickly damped. Accordingly, with the contact *a* of relay TR operating in this irregular fashion insufficient energy will be delivered by the resonant circuit to the winding of relay 120DR to cause this relay to pick up its contacts.

As previously pointed out, when the contact *a* of relay TR is recurrently operated at the 180 code rate, the oscillating energy in the resonant circuit including the capacitor C2 and transformer TT2 will be sufficient to cause the relay 180DR to be energized and pick up its contacts. If the relay TR is operating at 50 per cent on time, the relationship between the operation of the contact *a* and the oscillating energy in the tuned resonant circuit will be such that each time that oscillating energy is flowing through the capacitor C2 and the transformer TT2 to the terminal 4 of the decoding transformer DT, the contact *a* of relay TR will be picked up, so that the oscillating energy will flow from terminal 2 of the winding of transformer DT, through the battery LB, and over front contact *a* of the relay TR to the capacitor C2. Should the relay TR be operating on a scrambled or mutilated code, the contact *a* will not have this relationship to the oscillating energy, and accordingly, for a large percentage of the time, the contact *a* will not be picked up at the time the oscillating energy is flowing in the clockwise direction in the circuit. At such times, two alternate paths are afforded for the oscillating current energy, one path being through the winding of transformer DT and through the asymmetric units K1 and K2 in series, in the high resistance direction, and the other path being through the primary winding of the transformer TT1, the capacitor C1, and the asymmetric unit K1 in the high resistance direction. It will be seen, therefore, that unless the contact *a* is operating in synchronism with the oscillations of the energy in the circuit comprising capacitor C2 and transformer TT2, the oscillating energy will be forced to traverse paths including the asymmetric units K1 and K2 in their high resistance direction, so that the energy in the oscillating circuit is sufficiently damped to prevent the relay 180DR from being picked up.

From the foregoing, it will be apparent that with a frequency selective circuit arrangement provided in accordance with my invention, the degree of selectivity of the apparatus is highly increased, since the provision of asymmetric units suitably poled in a path which the oscillating current must traverse provides a means for causing the damping of the oscillating energy when the oscillations are not taking place in exact synchronism with the operation of the controlling contacts.

The arrangement shown in Fig. 2 and described above is suitable for use when two code rates must be detected, and where the track relay may be subjected to scrambled or mutilated codes which cause a reduction in the "on" time of the relay. In Fig. 3 of the drawings, there is shown an arrangement in accordance with my invention which may be employed where it is desired to detect the operation of the contact *a* of relay TR at a single frequency, and where it is required to check the operation of contact *a* for both "on" time and "off" time variations.

In Fig. 3, two windings, L1 and L2, having approximately equal turns, are provided on the transformer DT. The windings are provided with a common connection to the negative terminal of battery LB, through asymmetric units K3 and K4, so that the asymmetric unit K3 is associated with the winding L1, and the asymmetric unit K4 is associated with the winding L2. The capacitor C2 and the primary winding of transformer TT2 are tuned to resonance at a frequency of 180 cycles per minute, under which condition there is sufficient alternating current voltage across the secondary winding of the transformer to pick up the relay 180DR through the full-wave rectifier TK2, as explained previously in connection with Figs. 1 and 2.

In describing the operation of the arrangement shown in Fig. 3, it will be assumed that the track relay TR is initially released and its contact *a* is in its released position, and that the relay then commences to operate on impulses of coded energy at a rate of 180 operations per minute.

When the relay TR first picks up on a code impulse, magnetizing current is supplied to the winding L1 of transformer DT by a circuit which may be traced from the positive terminal of battery LB over front contact *a* of relay TR, through the winding L1 of transformer DT from terminal 6 to 7, and through the asymmetric unit K3 to the negative terminal of the battery LB. The direction of flow of the magnetizing current through the asymmetric unit K3 is in the low resistance direction of the unit. As a result of the current flow in the winding L1, a voltage is induced in winding L2 with a polarity such that current flows from terminal 8 of winding L2, through the asymmetric unit K4 in its low resistance direction, through the battery LB, over front contact *a* of relay TR, through the portion of winding L1 between terminals 5 and 6, through capacitor C2, and the primary winding of transformer TT2 to terminal 10 of winding L2. It will be seen that the direction of flow of the oscillating current which is supplied to the frequency selective circuit comprising capacitor C2 and the transformer TT2 at this time is in such direction that energy flows through the asymmetric unit K4 in its low resistance direction.

When relay TR releases, magnetizing current is supplied from the battery LB to the winding L2 of transformer DT by a circuit which may be traced from the positive terminal of battery LB over back contact *a* of relay TR, through the winding L2 of transformer DT from terminal 9 to terminal 8, and through the asymmetric unit K4 in its low resistance direction to the negative terminal of battery LB. The voltage induced in the winding L1 by the flow of current in winding L2 has a polarity such that the terminal 7 of winding L1 is positive with respect to terminal 5, and accordingly, the current in the oscillating circuit will flow at this time from capacitor C2, through the winding L1 of the transformer DT, through the asymmetric unit K3 in its low resistance direction, through the battery LB and back contact *a* of relay TR, through the lower portion of winding L2 from terminal 9 to terminal 10 and thence through the primary winding of transformer TT2 to capacitor C2.

With the contact *a* of relay TR operating at 180 times per minute, the oscillating current in the circuits previously traced will gradually build up and as a result the voltage across the secondary winding of transformer TT2 will be built up to a point where the rectified energy supplied to the winding of relay TR will be sufficient to pick up the contacts of the relay 180DR.

Since the oscillating energy in the frequency selective circuit does not attain its maximum value immediately, it is necessary for the contact *a* of relay TR to operate for at least three or four cycles before sufficient energy is supplied to the relay 180DR to pick up its contact. During this time successive impulses of energy from the battery are being supplied to the oscillating circuit, so that the amount of energy stored in the circuit is gradually built up to a maximum value, and thereafter only sufficient energy is supplied from the battery LB to the frequency selective circuit to compensate for the losses in the circuit in accordance with the theory of oscillatory circuits.

It will now be assumed that the relay TR is subjected to operation by a scrambled or mutilated code such that the percentage of "on" time is varied from the normal value of 50 per cent. Hence, when subjected to this condition, the relay TR does not pick up at a time when the current in the oscillatory circuit starts to flow in a direction from the capacitor C2 through the winding of transformer TT2, and as a result the energy must flow through the circuit including asymmetric unit K3, in the high resistance direction, and the winding L1, since the shunt path through the battery LB and front contact *a* of relay TR is not closed at this time. Accordingly, the high resistance interposed in the circuit by the asymmetric unit K3 on the half cycles of oscillating current for which the asymmetric unit K3 presents a high resistance will cause the energy in the oscillating circuit to be quickly dissipated.

By suitably proportioning the parts, particularly the asymmetric units K3 and K4, the resistance interposed by the asymmetric units K3 and K4 when current flows through the units in the direction in which the units present a high resistance can be made sufficiently high so that the oscillating energy is dissipated to a value less than that required to maintain the relay 180DR energized during the time that the contact *a* of relay TR is released.

Similarly, if the contact *a* of relay TR is operating improperly so that the contact remains closed in its picked-up position at a time when the current in the oscillatory circuit is flowing from capacitor C2 through the winding L1 of transformer DT, the only path for the oscillating energy will be through the asymmetric unit K4 in its high resistance direction, so that in this case also, the energy in the oscillatory circuit will be quickly damped, thereby causing relay 180DR to release and remain released as long as the contact *a* of relay TR is not properly operating in synchronism with the cycles of oscillating current in the circuit.

From the foregoing, it will be seen that I have provided a decoding system having a frequency selective circuit which is highly discriminatory against frequencies other than those of the simple fundamental frequency to which the circuit is tuned, by providing in the circuit asymmetric units arranged so that in normal operation the asymmetric units do not interfere with the flow of the oscillatory currents in the system, whereas under conditions in which the apparatus is operating at a frequency other than the simple fundamental frequency, the asymmetric units are interposed into the resonant circuit in such manner as to highly damp the oscillating energy present therein.

Although I have herein shown and described only two forms of highly selective resonant circuits embodying my invention, it will be understood by those skilled in the art that various changes and modifications may be made therein within the scope of the appended claims without departing from the spirit and scope of my invention.

Having thus described my invention, what I claim is:

1. In a system for detecting the code following operation of a contact adapted to be operated between a first and a second position at one or another of a plurality of frequencies, the combination comprising an autotransformer having a single winding, a series resonant circuit tuned to one of said frequencies, said series resonant circuit being connected across said autotransformer winding, a source of direct current, circuit means governed by said contact for reversibly supplying impulses of energy from said source to at least a portion of said autotransformer winding, and an asymmetric unit connected in series with said autotransformer winding and poled so that the current flowing from said direct current source flows through said asymmetric unit in its low resistance direction.

2. In a system for detecting the recurrent operation of of a contact adapted to be recurrently operated between a first and a second position at one or another of a plurality of frequencies, the combination comprising an autotransformer having a single winding, said winding having a first, a second, a third and a fourth terminal disposed along the winding in the order named, a series resonant circuit comprising a capacitor and the primary winding of a decoding transformer connected in series, a relay having a winding energized from a secondary winding of said decoding transformer, said series resonant circuit being tuned to resonance at a predetermined one of said frequencies, a source of direct current, one terminal of said source being connected to said second terminal of the autotransformer, the other terminal of said source being connected to said first terminal of the autotransformer winding when said contact is closed in one of its two positions, and to the third terminal of said autotransformer winding when said contact is in the other of its two positions, said series resonant circuit being connected across said first and said fourth terminals of said autotransformer winding, an asymmetric unit having a low resistance to the passage of current therethrough in one direction and a high resistance to the passage of current therethrough in the opposite direction, said asymmetric unit being interposed in the connection to said first terminal of said autotransformer winding and poled so that the energy supplied to said autotransformer from said source when said contact is closed in said one of its two positions flows through the asymmetric unit in the low resistance direction.

3. In combination, a contact adapted to be operated at times between a first and a second position at a given code rate with substantially equal periods at each position, a decoding transformer having a winding, circuit means including a source of direct current and said contact connected to said winding for reversibly supplying current impulses from said source to at least a portion of the winding and thereby creating across the winding an alternating voltage of a frequency corresponding to said given code rate of operation of said contact; a decoding unit comprising another transformer having a first and a second winding, a capacitor, and a relay connected to said second winding; said capacitor and first winding being connected in series and tuned to resonance at the frequency of said alternating voltage and connected to the winding of said decoding transformer, said relay being effectively energized in response to the oscillatory current caused to flow in the series resonant circuit due to said alternating voltage, an asymmetric unit interposed in said connection of the series resonant circuit to said decoding transformer winding and poled for its high resistance direction to shunt the oscillatory current through said contact and thereby check the synchronism of the oscillations of the current in the resonant circuit and the code operation of said contact.

4. In combination, a contact adapted to be operated at times between an open and a closed position at a given code rate, a decoding transformer having at least one winding, circuit means including a source of direct current and said contact at its closed position having connection to at least a portion of said transformer winding for recurrently supplying current impulses from said source to the winding and thereby creating across the winding an alternating voltage of a frequency corresponding to said given code rate of operation of said contact; a decoding unit comprising another transformer having a first and a second winding, a capacitor and a relay connected to said second winding; said capacitor and said first winding connected in series and tuned to resonance at the frequency of said alternating voltage, an asymmetric unit, other circuit means including said asymmetric unit to connect the series resonant circuit of said decoding unit to the winding of said decoding transformer, said asymmetric unit poled for its high resistance direction to block the oscillatory current flowing in said resonant circuit when the oscillatory current and the code operation of said contact are not in synchronism, said relay being effectively energized in response to the oscillatory current flowing in the resonant circuit.

References Cited in the file of this patent

UNITED STATES PATENTS

| | | |
|---|---|---|
| 2,070,900 | Harris | Feb. 16, 1937 |
| 2,162,268 | Meszar | June 13, 1939 |
| 2,242,987 | Allen | May 20, 1941 |
| 2,243,740 | O'Hagan | May 27, 1941 |
| 2,309,174 | Dodd | Jan. 26, 1943 |
| 2,353,499 | Purington | July 11, 1944 |
| 2,535,104 | Mierlo | Dec. 26, 1950 |
| 2,542,592 | Styren | Feb. 20, 1951 |
| 2,612,551 | Kreiner | Sept. 30, 1952 |